US009026550B2

(12) United States Patent
Fradkin et al.

(10) Patent No.: US 9,026,550 B2
(45) Date of Patent: May 5, 2015

(54) TEMPORAL PATTERN MATCHING IN LARGE COLLECTIONS OF LOG MESSAGES

(71) Applicants: Dmitriy Fradkin, Princeton, NJ (US); Fabian Moerchen, Vashon, WA (US)

(72) Inventors: Dmitriy Fradkin, Princeton, NJ (US); Fabian Moerchen, Vashon, WA (US)

(73) Assignee: Siemens Aktiengesellschaft, Munich (DE)

(*) Notice: Subject to any disclaimer, the term of this patent is extended or adjusted under 35 U.S.C. 154(b) by 143 days.

(21) Appl. No.: 13/737,134

(22) Filed: Jan. 9, 2013

(65) Prior Publication Data

US 2013/0198227 A1 Aug. 1, 2013

Related U.S. Application Data

(60) Provisional application No. 61/592,152, filed on Jan. 30, 2012.

(51) Int. Cl.
G06F 17/30 (2006.01)

(52) U.S. Cl.
CPC .... G06F 17/30424 (2013.01); G06F 17/30551 (2013.01); G06F 17/30548 (2013.01)

(58) Field of Classification Search
CPC .............. G06F 17/30657; G06F 17/30424; G06F 17/30551
USPC ......................................................... 707/769
See application file for complete search history.

(56) References Cited

U.S. PATENT DOCUMENTS

| | | | |
|---|---|---|---|
| 7,594,097 B2* | 9/2009 | Webber ..................... 712/214 |
| 2005/0251860 A1* | 11/2005 | Saurabh et al. ............... 726/23 |
| 2005/0256849 A1* | 11/2005 | Krishnaswamy et al. ........ 707/3 |
| 2008/0270399 A1* | 10/2008 | Feng et al. ...................... 707/6 |
| 2009/0089252 A1* | 4/2009 | Galitsky et al. ................. 707/3 |
| 2011/0131588 A1* | 6/2011 | Allam et al. .................. 719/318 |

* cited by examiner

Primary Examiner — James Trujillo
Assistant Examiner — Grace Park

(57) ABSTRACT

A method for identifying a plurality of patterns of events from within event log file data includes receiving a query comprising a plurality of patterns, each of the patterns comprising a plurality of events. One or more key events is determined from the plurality of patterns of events. The one or more key events is located within a database of stored event log file data. An event stream comprising the key events and all other events of the event log file data occurring within a predetermined time span from the time of the located one or more events is generated. Each of the plurality of patterns of the received query are searched for from within the event stream.

19 Claims, 4 Drawing Sheets

TEMPORAL PATTERN MATCHING IN LARGE COLLECTIONS OF LOG MESSAGES

CROSS-REFERENCE TO RELATED APPLICATION

The present application is based on provisional application Ser. No. 61/592,152, filed Jan. 30, 2012, the entire contents of which are herein incorporated by reference.

TECHNICAL FIELD

The present disclosure relates to pattern matching and, more specifically, to temporal pattern matching in large collections of log messages.

DISCUSSION OF THE RELATED ART

Complex systems have widespread use in industry, commerce, healthcare, science, and many other fields of endeavor. Modern implementations of complex systems generally involve a large number of devices that function in concert. Many of these devices feature a combination of computational hardware and software. Throughout the course of operation, these devices may produce a large amount of data that may be stored in log files. This data may be referred to as event data as it may pertain to the operational events of the particular devices. Proper analysis of this event data may be used to draw inferences about the functionality of the complex system and to predict future occurrences, conditions, and situations that may require or otherwise benefit from intervention.

One area where such prediction is of particular value is equipment maintenance. Here, predictive methods may be applied to event data to identify patterns of event data that may be indicative of the need for maintenance of one or more sub-systems. These predictive methods may be applied to maintenance of equipment such as medical scanners, gas turbines, wind turbines, solar plants, and so forth. Such predictive methods may be used to initiate proactive maintenance strategies that may significantly lower maintenance costs and improve customer satisfaction. By accurately identifying potential problems at an early stage, repairs may be performed during scheduled downtime and spare parts may be ordered ahead of time where there is strong evidence that a particular failure will occur. By detecting potential failures early, downtime and maintenance costs may be minimized.

SUMMARY

A method for identifying a plurality of patterns of events from within event log file data includes receiving a query comprising a plurality of patterns, each of the patterns comprising a plurality of events. One or more key events is determined from the plurality of patterns of events. The one or more key events is located within a database of stored event log file data. An event stream comprising the key events and all other events of the event log file data occurring within a predetermined time span from the time of the located one or more events is generated. Each of the plurality of patterns of the received query are searched for from within the event stream.

One or more of the plurality of patterns of the received query may be detected from within the event stream and a maintenance procedure to be performed on a system may be detected based on the detected patterns.

The plurality of patterns of the query may be predictive patterns for predicting maintenance to be performed on a system.

Determining the one or more key events from the plurality of patterns of events may include utilizing statistics derived from the stored event log file data. The utilized statistics may include a frequency with which each event of each pattern of the query occurs within the stored event log file data.

Determining the one or more key events from the plurality of patterns of events may include determining which events of the plurality of patterns of events are least occurring within the event log file data and using the determined least occurring events as the key events.

The events of the event stream may be presented in chronological order. The predetermined time span may be equal to twice the length of a longest pattern associated with the one or more key events.

Searching for each of the plurality of patterns of the received query from within the event stream may include searching for multiple patterns concurrently. Searching for each of the plurality of patterns of the received query from within the event stream may be performed using a pattern matching engine.

The event log file data may include log messages generated from operational entities functioning within a system.

The event stream may be generated at a time after the event log file data is stored in the database and the searching for each of the plurality of patterns of the received query data from within the event stream may be performed in-real time as the event stream is generated.

A method for identifying a plurality of patterns of events from within event log file data includes receiving a query including a plurality of patterns, each of the patterns including a plurality of events. One or more key events is determined from the plurality of patterns of events according to a frequency by which each event from each pattern of event of the query occurs within the event log file data. The one or more key events is located within a database of stored event log file data. An event stream including the key events and all other events of the event log file data occurring within a predetermined proximity to the located one or more events is generated. Each of the plurality of patterns of the received query is searched for from within the event stream.

One or more of the plurality of patterns of the received query may be detected from within the event stream. A maintenance procedure to be performed on a system is identified based on the detected patterns. The plurality of patterns of the query may be predictive patterns for predicting maintenance to be performed on a system. Searching for each of the plurality of patterns of the received query from within the event stream may include searching for multiple patterns concurrently.

The searching for each of the plurality of patterns of the received query from within the event stream may be performed using a pattern matching engine. The event log file data may include log messages generated from operational entities functioning within a system. The event stream may be generated at a time after the event log file data is stored in the database and the searching for each of the plurality of patterns of the received query data from within the event stream may be performed in-real time as the event stream is generated.

A computer system includes a processor and a non-transitory, tangible, program storage medium, readable by the computer system, embodying a program of instructions executable by the processor to perform method steps for identifying a plurality of patterns of events from within event log file data. The method includes receiving a query including a plurality of patterns, each of the patterns including a plurality of events. One or more key events is determined from the plurality of patterns of events. The one or more key events is located within a database of stored event log file data. An event stream comprising the key events and all other events of the event log file data occurring within a predetermined proximity of the located one or more events is generated. Each of the plurality of patterns of the received query is searched for from within the event stream.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
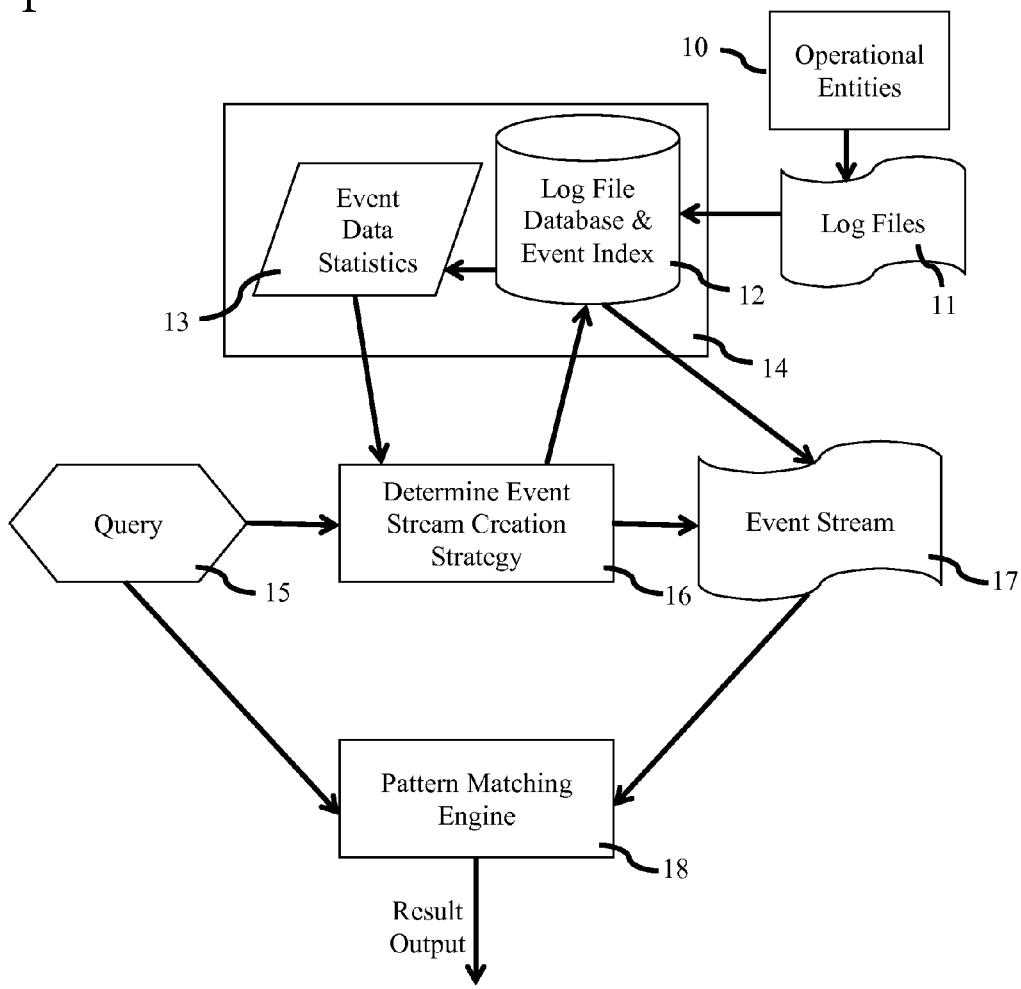
FIG. 1 is a schematic diagram illustrating physical and data components which contribute to temporal pattern matching in large collections of log messages in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide various systems and approaches for matching patterns within large collections of log messages. Moreover, exemplary embodiments of the present invention are able to effectively match temporal/sequential patterns, which may be characterized by their respective order of occurrence. The patterns matched upon the log messages may include known patterns that may be indicative of the need for future maintenance of the systems generating the log messages. As the log data may be pre-recorded, for example, within a database, exemplary embodiments of the present invention seek to generate an event stream, which is a selective recollection of stored data, presented in temporal and/or sequential order. This event stream may be created to optimize the matching of multiple different predictive patterns, at substantially the same time, so that time and computational costs may be minimized. The particular predictive patterns may be provided by a query, which may originate from a user or automated sources.

Figure 2:
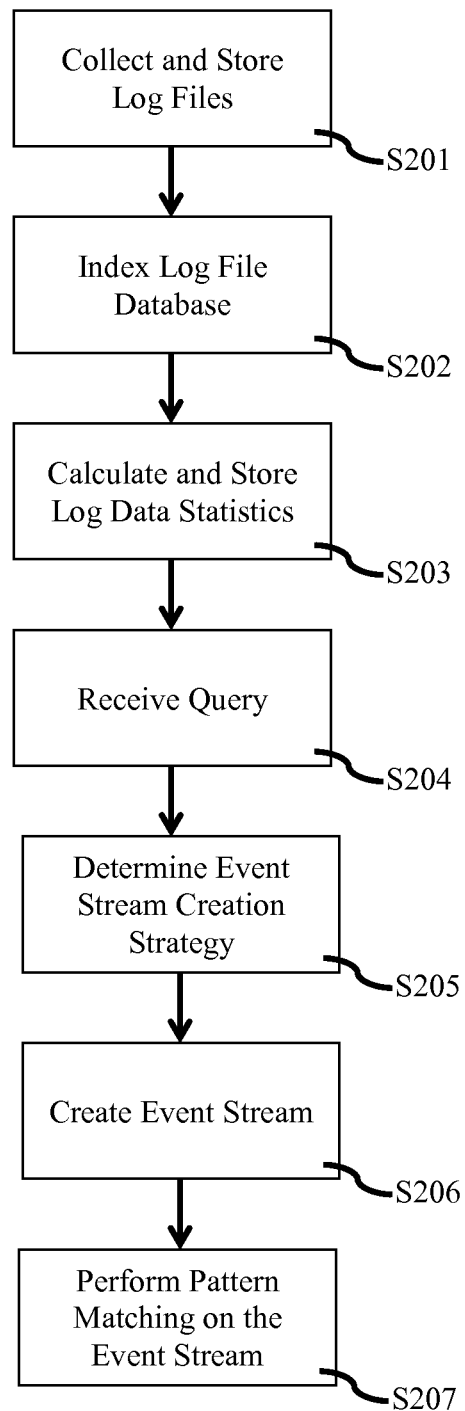
FIG. 2 is a flow chart illustrating methods for performing temporal pattern matching in large collections of log messages in accordance with exemplary embodiments of the present invention.

FIG. 1 is a schematic diagram illustrating physical and data components which contribute to temporal pattern matching in large collections of log messages in accordance with exemplary embodiments of the present invention. FIG. 2 is a flow chart illustrating methods for performing temporal pattern matching in large collections of log messages in accordance with exemplary embodiments of the present invention. Exemplary embodiments of the present invention are described below in detail with reference to FIGS. 1 and 2.

The equipment under consideration, the "operational entities" 10 may include a set of hardware and software elements operating in tandem to provide one or more functions. For example, the operational entities 10 may comprise a medical scanner, gas turbines, or other complex machinery involving a plurality of data processing components. Alternatively, the operational entities 10 may include the components of a Hospital Information System (HIS) or some other collection of networked computerized components all working with a common purpose or as part of a greater network. The operational entities 10 may each generate log files 11, multiple entities 10 could together generate a log file 11, and/or a single entity 10 could generate multiple files, for example, being separated by date/rime or by various subcomponents. The log files 11 may include messages that the operational entities 10 transfer between themselves and/or generate to report on their present condition. The log files 11 may be sent by and/or received by other operation entities 10 or from external sources. The log files 11 may be generated during the operation of the operational entities 10.

The log files 11 may be collected and stored (Step S201), for example, in a log file database 12. Traditionally, large collections of data may be stored in relational databases. While relational databases may be well suited for storing independent instances of data, relational databases alone may not be optimally suited for handling the sequential/temporal characteristics of log data. This is because querying data based upon sequential and/or temporal order may be inefficient as relational databases may not be able to easily process queries directed to data within a provided temporal range without having to firs process a k-fold self join of a table in order to compare time stamps of a sequence of k events. This processing task may become even more difficult as the query establishes additional constraints such as negation (e.g. "not followed by X within 5 minutes) or frequency conditions (e.g. "at least 5X within 15 minutes").

Accordingly, rather than establishing a relational database, the log file database 12 may store log data in sequential/temporal order. The log file database 12 may be indexed to provide for efficient data recall (Step S202) and the index may be stored along with the log file database 12. The indexing may be performed by a data management engine 14, which may be associated with the log file database and event index 12.

The index may be built upon such fields as "EventCode" (e.g. an identification code for specific event types), "EquipmentCode" (e.g. an identification of the operational entity where the event occurs), "Date" (e.g. a date of the event) and "Text" (e.g. text message containing event specifics, including additional parameters).

The data management engine 14 may employ one or more known approaches for performing data storage and indexing such as using traditional relational databases with integrated index structures, using column oriented databases with integrated index structures, using standalone index structures such as APACHE LUCENE, developed by the Apache Software Foundation, or distributed data management systems with query and index structures such as the HDFS distributed file system and/or HIVE data warehouse, which are components of APACHE HADOOP, also developed by the Apache Software Foundation. Other suitable tools that may be used include the MongoDB document database system, which is developed by 10GEN.

In accordance with exemplary embodiments of the present invention, the index enables quick retrieval of individual events based on temporal or text constraints. The index may support exact matches, range queries (for example, on dates) and regular expressions. An index on EquipmentCode may be particularly useful because only events with the same EquipmentCode are considered for pattern matching.

The data management engine 14 may also calculate event data statistics 13 and these event data statistics 12 may be stored within the database 12 (Step S203). The event data statistics 12 may include statistics pertaining to EventCode frequency. As EventCode data pertains to identifying a particular event type, the event data statistics 12 may include a number of times a given event occurs, a frequency of occurrence, and other statistical measures quantifying the manner in which the particular event type occurs.

The indexing and calculating of statistics of steps S202 and S203 may either be performed as the log files are collected and stored (Step S201) or at a convenient time of reduced data acquisition, such as over night. After these steps have been performed, at least initially, a query 15 may be received (Step S204). The query 15 may be provided by a human user or it may be automatically provided. The query 15 may include a set of patterns, which may be indicative of some future state or required action. These patterns may be patterns within the log file database that are understood to be predictive or otherwise significant. The patterns may include temporal and/or sequential patens of particular EventCodes. As contemplated in accordance with exemplary embodiments of the present invention, each query 15 includes a plurality of patterns. For example, each query 15 may include as few as two patterns or as many as tens, hundreds, or even thousands of patterns.

Exemplary embodiments of the present invention may also partition a query into a plurality of sets of patterns. Each set of patterns may then be processed separately. Processing of the pattern sets may include, for example, creation and evaluation of the data stream. Thus multiple data streams may be created and patterns may be matched from each of the data streams individually. This approach may be combined with techniques for parallel data processing to reduce overall processing time. Partitioning of the query into groups of patterns may be performed by grouping the patterns based on, for example, similarity of duration and/or on overlap in EventCodes.

Thereafter, an event stream creation strategy 16 may be determined (Step S205). The event stream creation strategy 16 dictates how the event stream 17 is to be created from the log file data 11 stored in the database 12. The event stream 17 is a sub-set of the log file data stored in the database 12 that is retrieved and provided/streamed in its original chronological/sequential order. Accordingly, the event stream creation strategy 16 may dictate, among other things, which of the log file data stored in the database 12 is to be streamed as part of the event stream 17. For example, the event stream creation strategy 16 defines the data sub-set to be incorporated into the event stream 17.

As determining the event stream creation strategy 16 includes identifying the sub-set of log file data to include in the event stream 17, exemplary embodiments of the present invention provide approaches for efficiently retrieving the desired log file data sub-set from the database 12. One relatively simple approach would be to retrieve all log file data from the database 12 and include this full sequence of data in the event stream 17. While simple, this approach may be computationally expensive to preform since generally it is only a small fraction of events that are relevant for finding pattern matches. Accordingly, this approach may only be suited for relatively small data sets.

Exemplary embodiments of the present invention provide for temporal pattern matching in relatively large collections of log messages and accordingly, alternative event stream creation approaches are contemplated. According to one such approach, only log data exhibiting occurrences of the events found within the patterns of the query are incorporated into the event stream. For example, if the query included the patterns, "ABEFIJ," "ACEGIK" and, "AXBYCZ" then only log data exhibiting occurrences of one or more of "A," "B," "C," "E," "F," "G," "I," "J," "K," "X," "Y," or "Z" would be included in the event stream. All data that did not include one of these named events would be excluded from the event stream. This approach may be especially suitable where none of the events of the patterns of the query are too frequent within the log file data. However, if at least one event is frequent within the log file data, the event stream may become too large to process efficiently.

Figure 3:
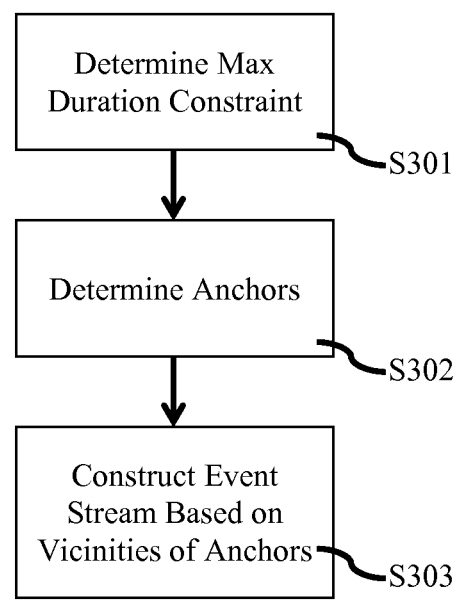
FIG. 3 is a flow chart illustrating an approach for event stream creation in accordance with exemplary embodiments of the present invention.

Exemplary embodiments of the present invention therefore provide an additional approach for event stream creation. FIG. 3 is a flow chart illustrating an approach for event stream creation in accordance with exemplary embodiments of the present invention. Under this approach, a maximum duration constraint T may be determined or reasonably estimated (Step S301). The maximum duration constraint T signifies the known or estimated time span of a given pattern within the query. As the query may contain multiple patterns, each pattern may have its own maximum duration constraint T. The maximum duration constraint T may be taken as the longest possible duration of the particular pattern. Thus to the extent that the duration in time of the given pattern may be variable, the maximum duration constraint T would be the longest possible duration. The maximum duration constraint T is therefore also the shortest length of time that the given pattern is sure to be fully contained within.

The event code statistics 13 may be used to determine one or more "anchor" events (Step S302). As each pattern of the query involves multiple events, exemplary embodiments of the present invention focus on identifying at least one event of each pattern within the log file database and event index that may be used as an anchor event. The anchor event may be, for example, the event of the particular pattern that is least frequently found within the log files of the full set of data. An assumption is made that if the particular anchor event is to be found within an instance of the particular pattern being searched for, then that instance of the particular pattern would have to be present within its corresponding vicinity. As the maximum duration constraint T is the longest possible duration for the given pattern, the vicinity may be set as the span of time from one T prior to the anchor event through one T after the anchor event. Thus, the length of the vicinity is 2T.

The presence of the particular pattern may thereafter be searched for within the corresponding vicinity of the anchor event. Thus, of the full set of event log data, only that data that is within the 2T vicinity of the particular anchor event is included within the event stream (Step S303). In this way, rather than searching for each pattern within the entire set of data, which may be computationally inefficient, exemplary embodiments of the present invention limit the event stream to the 2T vicinity of the particular anchor event.

Selecting the least frequent event as the anchor event may reduce the size of the event stream as compared with selecting a more frequent event as the anchor event as a vicinity of data is incorporated into the event stream for each instance of the anchor event being found within the full data set and the fewer anchor event instances to be found, the fewer vicinities of data are added to the event stream. However, anchor selection is not necessarily limited to determining the least frequently occurring event. Other event statistics may be used instead of or in addition to frequency.

As each query includes multiple patterns, each pattern may have its own anchor points and its own vicinities and the event stream may include data within the corresponding vicinity of each anchor for each pattern. However, as there is to be one single event stream within which multiple patterns are searched for, selection of an anchor for one pattern may be influenced by the selection of an anchor for another pattern. For example, if a first pattern uses a particular anchor and a second pattern may be found using that same anchor, and has a vicinity that is less than the vicinity of the first pattern, then using the anchor of the first pattern as the anchor for the second pattern costs nothing in terms of adding to the event stream and thus the same anchor may be used for the purposes of the second pattern even though there may be other anchors that could have been used that occur with even less frequency within the original data.

Thus, selection of the anchors may be performed so as to minimize total event stream size, rather than simply minimizing the contribution to the event stream by each pattern of the query individually.

Moreover, for a single pattern, it may be preferable to utilize multiple anchors where the total event stream size can be further reduced. For example, if a pattern includes events A, B, C, and (D or E) then A, B, or C may be used by themselves as anchors but if D and E are together less frequent than any one of A, B, or C then it may be preferable to use both D and E as anchors. Thus all data within the vicinity of either D or E may be added to the event stream.

Additionally, as mentioned above, a single anchor may be used for detecting multiple patterns. Thus any number of anchors may be used for any number of patterns. For example, one anchor may be used for one pattern, two anchors may be used for one pattern, two anchors may be used for one pattern, two anchors may combine for use with three patterns, etc. The number of combinations is therefore limitless.

Thus, determination of the event stream strategy (S205) may involve making use of the event data statistics 13 in determining what anchors should be used to minimize total event stream size. Thereafter, the event stream may be created by retrieving the log file data within respective vicinities of the selected anchors and presenting the retrieved data to a pattern matching engine 18 in sequential and/or chronological order (Step S206). This may include ordering the retrieved data by origin (e.g. by EquipmentCode) and by time (e.g. Date).

The pattern matching engine may thereafter perform pattern matching on the event stream (Step S207). This may include searching for each pattern in the query within the event stream data. The pattern matching engine may comprise a rule matching engine, examples of which are known in the art. The results of the search may thereafter be provided either to a human user or to a requesting software service.

Figure 4:
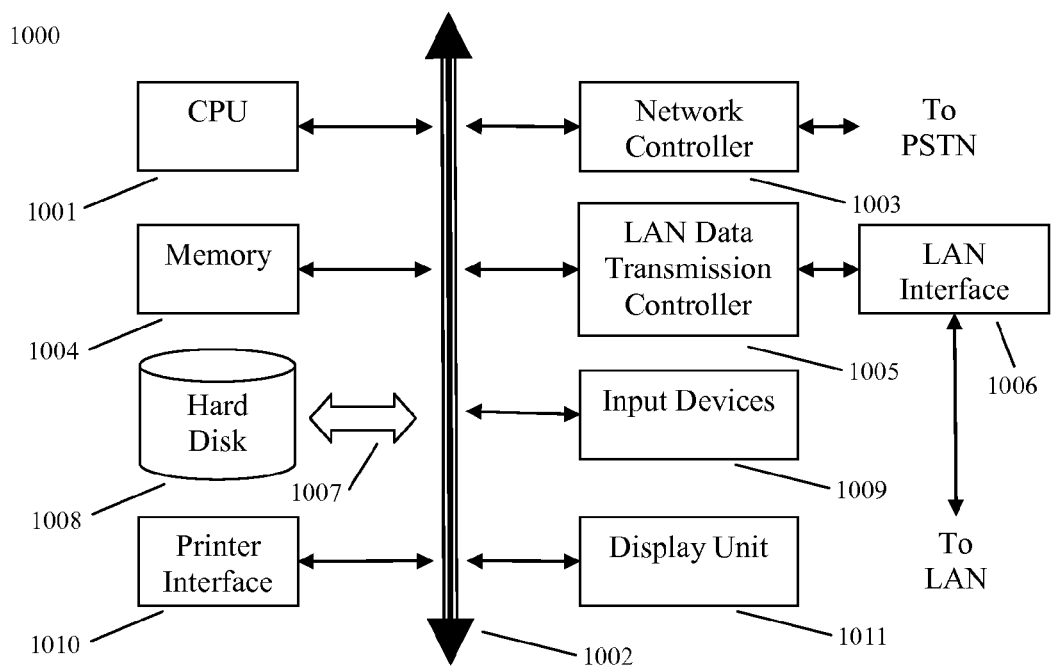
FIG. 4 shows an example of a computer system capable of implementing the method and apparatus according to embodiments of the present disclosure.

FIG. 4 shows an example of a computer system which may implement a method and system of the present disclosure. However, it is to be understood that the computer system described herein is offered merely as an example and this description should not be understood as limiting the implementation of the invention in any way. One of ordinary skill in the art would readily appreciate that the methods and systems of the present disclosure may be implemented using any form of data processing device, including, but not limited to the hardware described herein.

The system and method of the present disclosure may be implemented in the form of a software application running on a computer system, for example, a mainframe, personal computer (PC), handheld computer, server, a combination of one or more of the above, etc. The software application may be stored on a recording media locally accessible by the computer system and accessible via a hard wired or wireless connection to a network, for example, a local area network, or the Internet.

The computer system referred to generally as system 1000 may include, for example, one or more central processing units (CPUs) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse, touchscreen sensor, etc. As shown, the system 1000 may be connected to a data storage device, for example, a hard disk and/or flash-memory storage device, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for identifying a plurality of patterns of events from within event log file data, comprising:
    receiving a query comprising a plurality of patterns, each of the patterns comprising a plurality of events;
    determining one or more key events from the plurality of patterns of events;
    locating the one or more key events within a database of stored event log file data;
    generating an event stream comprising the key events and all other events of the event log file data occurring within a predetermined time span from the time of the located one or more events; and
    searching for each of the plurality of patterns of the received query from within the event stream,
    wherein the predetermined time span is equal to twice the length of a longest pattern associated with the one or more key events.

2. The method of claim 1, additionally comprising:
    detecting one or more of the plurality of patterns of the received query from within the event stream; and
    identifying a maintenance procedure to be performed on a system based on the detected patterns.

3. The method of claim 1, wherein the plurality of patterns of the query are predictive patterns for predicting maintenance to be performed on a system.

4. The method of claim 1, wherein determining the one or more key events from the plurality of patterns of events includes utilizing statistics derived from the stored event log file data.

5. The method of claim 4, wherein the utilized statistics includes a frequency with which each event of each pattern of the query occurs within the stored event log file data.

6. The method of claim 1, wherein the determining the one or more key events from the plurality of patterns of events includes determining which events of the plurality of patterns of events are least occurring within the event log file data and using the determined least occurring events as the key events.

7. The method of claim 1, wherein the events of the event stream are presented in chronological order.

8. The method of claim 1, wherein searching for each of the plurality of patterns of the received query from within the event stream includes searching for multiple patterns concurrently.

9. The method of claim 1, wherein the searching for each of the plurality of patterns of the received query from within the event stream is performed using a pattern matching engine.

10. The method of claim 1, wherein the event log file data includes log messages generated from operational entities functioning within a system.

11. The method of claim 1, wherein the event stream is generated at a time after the event log file data is stored in the database and the searching for each of the plurality of patterns of the received query data from within the event stream is performed in-real time as the event stream is generated.

12. A method for identifying a plurality of patterns of events from within event log file data, comprising:
   determining one or more key events from a plurality of patterns of events according to a frequency by which each event from each pattern of event occurs within the event log file data;
   locating the one or more key events within a database of stored event log file data; and
   generating an event stream comprising the key events and other events of the event log file data occurring within a predetermined time span from the time of the located one or more key events
   wherein the predetermined time span is equal to twice the length of a longest pattern associated with the one or more key events.

13. The method of claim 12, additionally comprising:
   receiving a query comprising the plurality of patterns;
   searching for each of the plurality of patterns of the received query from within the event stream;
   detecting one or more of the plurality of patterns of the received query from within the event stream; and
   identifying a maintenance procedure to be performed on a system based on the detected patterns.

14. The method of claim 13, wherein searching for each of the plurality of patterns of the received query from within the event stream includes searching for multiple patterns concurrently.

15. The method of claim 13, wherein the searching for each of the plurality of patterns of the received query from within the event stream is performed using a pattern matching engine.

16. The method of claim 13, wherein the event stream is generated at a time after the event log file data is stored in the database and the searching for each of the plurality of patterns of the received query data from within the event stream is performed in-real time as the event stream is generated.

17. The method of claim 12, wherein the plurality of patterns are predictive patterns for predicting maintenance to be performed on a system.

18. The method of claim 12, wherein the event log file data includes log messages generated from operational entities functioning within a system.

19. A computer system comprising:
   a processor; and
   a non-transitory, tangible, program storage medium, readable by the computer system, embodying a program of instructions executable by the processor to perform method steps for identifying a plurality of patterns of events from within event log file data, the method comprising:
   receiving a query comprising a plurality of patterns, each of the patterns comprising a plurality of events;
   determining one or more key events from the plurality of patterns of events;
   locating the one or more key events within a database of stored event log file data;
   generating an event stream comprising the key events and all other events of the event log file data occurring within a predetermined time span from the time of the located one or more events; and
   searching for each of the plurality of patterns of the received query from within the event stream,
   wherein the predetermined time span is equal to twice the length of a longest pattern associated with the one or more key events.

* * * * *